United States Patent [19]
Hansen

[11] Patent Number: 5,214,888
[45] Date of Patent: Jun. 1, 1993

[54] INSTALLATION DUCT

[75] Inventor: Joerg Hansen, Wettringen, Fed. Rep. of Germany

[73] Assignee: Hewing GmbH, Ochtrup, Fed. Rep. of Germany

[21] Appl. No.: 850,749

[22] Filed: Mar. 13, 1992

[30] Foreign Application Priority Data

Mar. 18, 1991 [DE] Fed. Rep. of Germany ... 9103265[U]

[51] Int. Cl.$^5$ .............................................. E04B 1/00
[52] U.S. Cl. ...................... 52/220.7; 174/48
[58] Field of Search .............. 52/220, 221; 174/48, 174/49

[56] References Cited

U.S. PATENT DOCUMENTS

| | | | |
|---|---|---|---|
| 3,255,563 | 6/1966 | Sauer | 52/221 |
| 3,692,920 | 9/1972 | Santarelli | 174/48 |
| 4,135,337 | 1/1979 | Medlin | 52/221 |
| 5,086,194 | 2/1992 | Bruinsma | 174/48 |

FOREIGN PATENT DOCUMENTS

| | | | |
|---|---|---|---|
| 7900898 | 8/1980 | Netherlands | 174/48 |
| 452640 | 1/1968 | Switzerland | 174/48 |

Primary Examiner—Carl D. Friedman
Assistant Examiner—Joanne C. Downs
Attorney, Agent, or Firm—Jordan & Hamburg

[57] ABSTRACT

An installation duct for utility lines, particularly for two-pipe installations, is formed by a retaining strip at the wall side and a capping attached thereto, and can be provided in the upper region with a feedthrough opening for vertical branch piping. In order to close off the installation duct in the region of the branch piping with little effort and to fashion it so that it can be made to fit different pipe diameters, the capping has, in the region of the feedthrough opening, a covering hood which can be made to fit different branch piping arrangements.

18 Claims, 3 Drawing Sheets

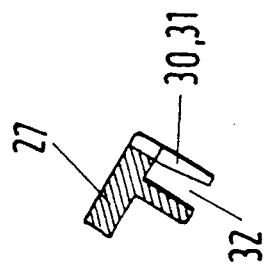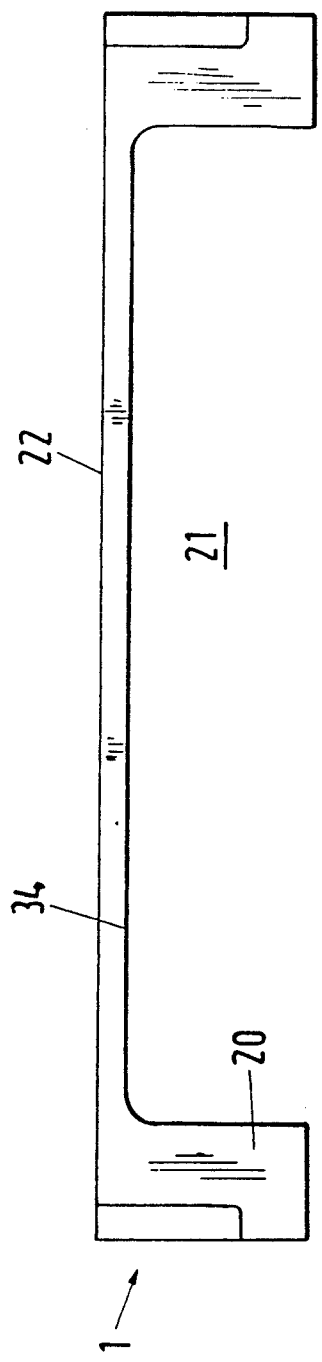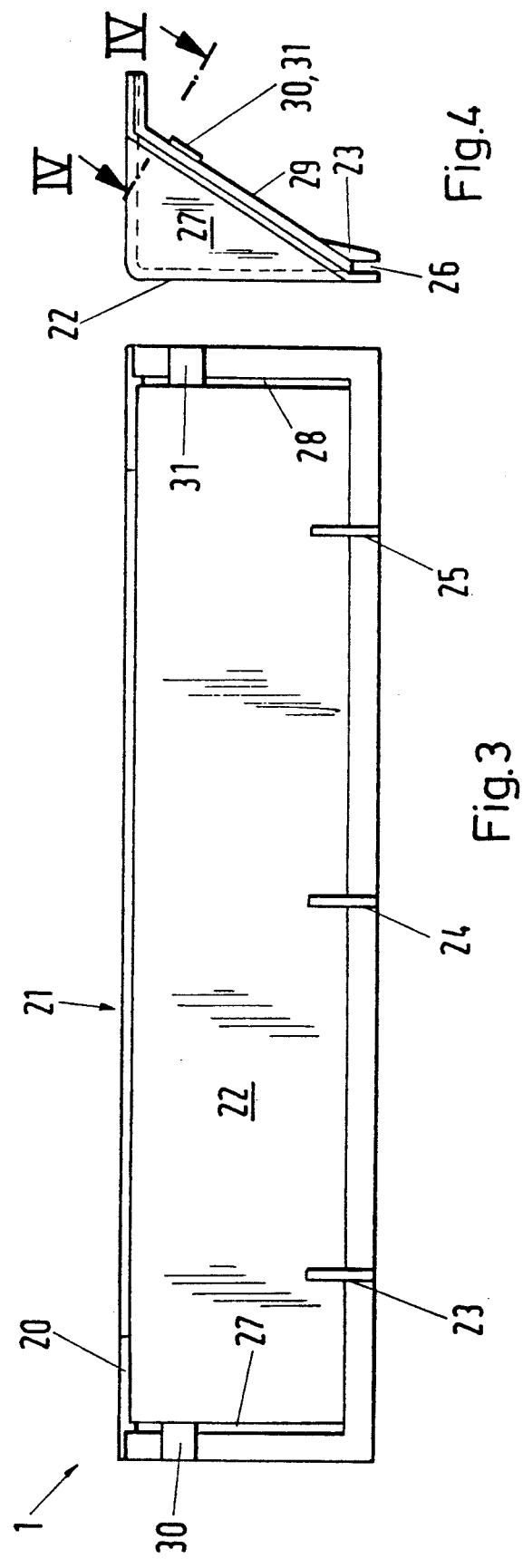

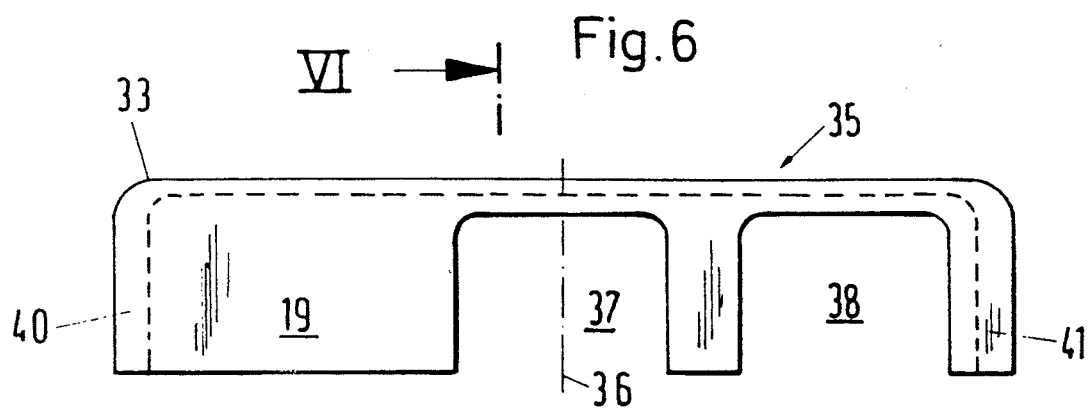
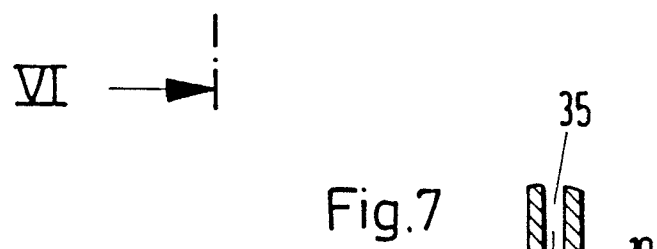
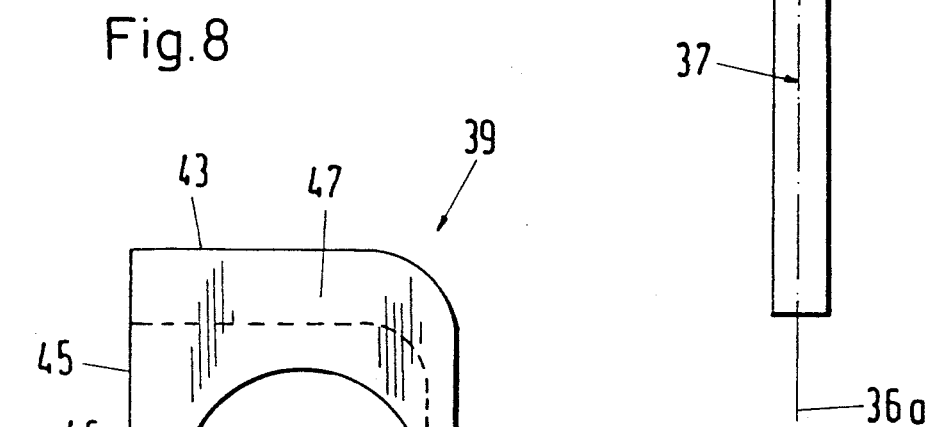
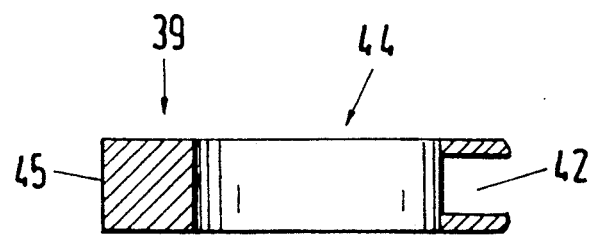

INSTALLATION DUCT

The invention relates to an installation duct for utility lines, particularly for two-pipe installations.

BACKGROUND OF THE INVENTION

Starting out from an installation duct of the above-described type, which is known from the German patent 24 58 311, it is an object of the invention to improve this duct in the area of branch piping in such a manner, that it can be adapted with little effort to different branch piping and different distances between piping and, at the same time, present a visibly pleasing appearance.

SUMMARY OF THE INVENTION

For an installation duct, the invention provides a covering hood, which can be mounted particularly easily at a convenient place and, as accessory of the installation, can be placed on the upper feedthrough opening of the capping and closed off fitted to different branch piping. The covering hood, which can be combined flush with the capping, creates for the service area a visually uniform appearance, which hides the connecting elements, and can be dismantled with little effort for a later access.

With regard to significant further advantages and details of the invention, reference is made to the following description and the drawing, in which an embodiment of the object of the invention is illustrated diagrammatically in greater detail.

BRIEF DESCRIPTION OF THE DRAWINGS

FIG. 2 shows a plan view of an inventive covering hood in detailed representation, FIG. 3 shows an internal view of the covering hood of FIG. 2, FIG. 4 shows a side view of the covering hood of FIGS. 2 and 3, FIG. 5 shows a section through the covering hood along the line IV—IV in FIG. 4, FIG. 6 shows a plan view of a covering screen of the invention, FIG. 7 shows a section along the line VI—VI of FIG. 6, FIG. 8 shows a plan view of the inventive pipe screen, and FIG. 9 shows a section along the line VIII—VIII of FIG. 8.

DESCRIPTION OF THE PREFERRED EMBODIMENTS

Figure 1:
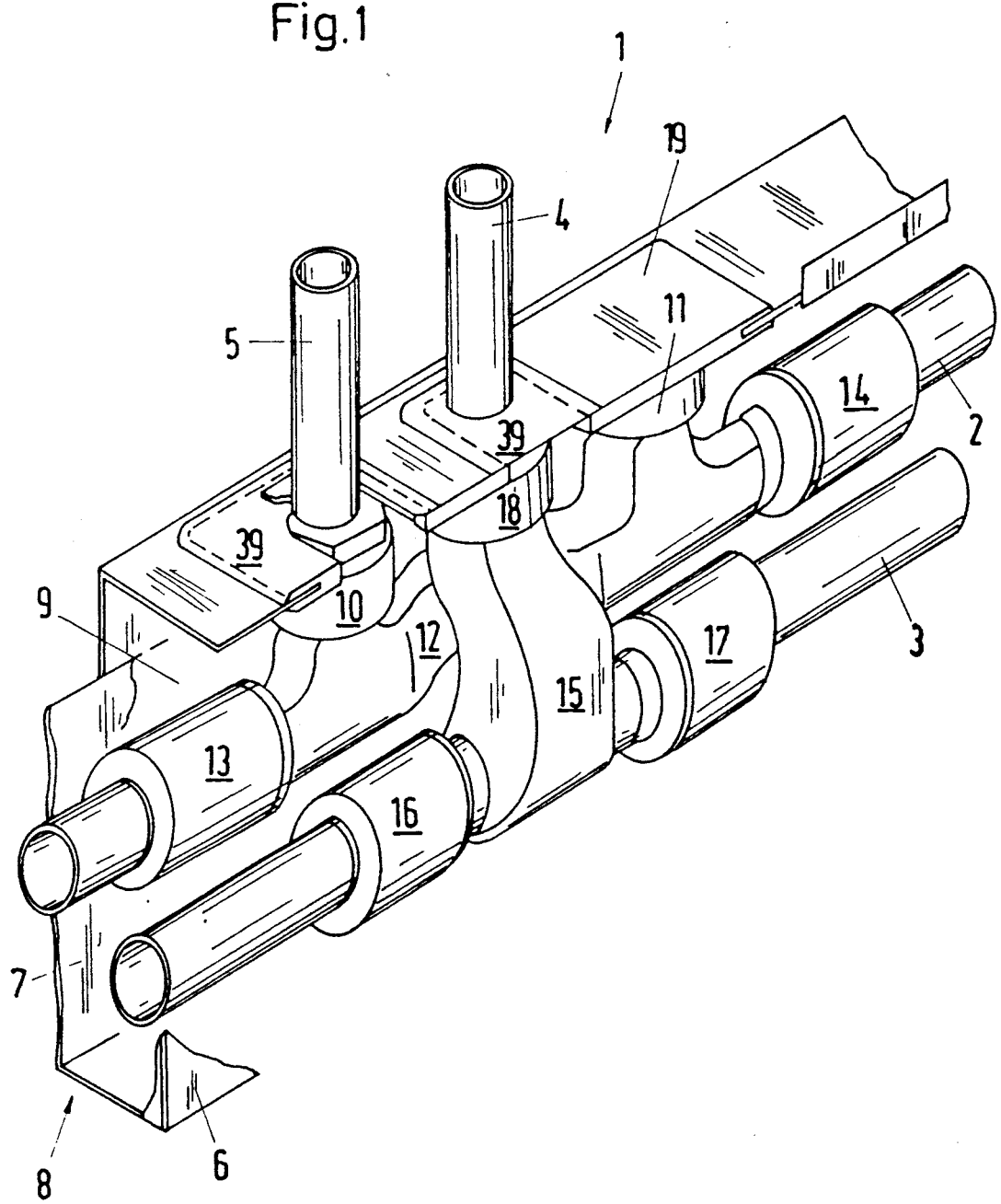
FIG. 1 shows a perspective, partially sectional representation of the inventive installation duct with two utility lines and two branch lines.

FIG. 1 shows the covering hood, which is labelled 1 as a whole, in the connecting region of two utility lines 2, 3 with two associated branch lines 4, 5, which form, for example, risers for heaters. A cable or pipe duct 8, which is formed by a retaining strip 6 mountable on the side of a building wall structure or the like, as well as by a capping 7 attached to the retaining strip 6, has in the region of the capping 7, a feedthrough opening 9 which is closed off by the covering hood 1. Two branch lines 4, 5 are connected to the utility lines 2 and 3 over connections 10 or 11 and 18 and branch pipe gates 12 and 15, which are connected with the utility lines 2, 3 by means of fittings 13, 14, 16, 17. Utility line 3 has a single branch pipe gate 15 and utility line 2 a double branch pipe gate 12. The covering hood 1 is provided with a covering screen 19 which has passages free for the branch piping 4, 5 having the connections 10 and 18 and appropriately covers the connection 11 that is not required.

The covering hood 1, which is shown in greater detail in FIGS. 2 to 5, has in the upper feedthrough wall 20 a form recess 21 into which the covering screen 19 can be inserted.

In the region of its vertical front wall 22 (FIG. 3), the covering hood 1 is provided on the inside with locking shoulders 23, 24, 25, which can be locked on the capping 7 with a profile recess 26 (FIG. 4) in the edge region of the feedthrough opening 9.

At the side, the covering hood 1 has end walls 27, 28 with an inclined lateral edge 29 (FIG. 4), which is supported flush on the capping 7. Locking shoulders 30, 31, which can be connected with the capping 7 and have a form recess 32 (FIG. 5) are provided in the region of the end walls 27, 28 to secure the connection with the capping 7.

The covering screen 19, shown in greater detail in FIGS. 6 and 7, has an external contour 33, which conforms with the form recess 21 of the covering hood 1 and has an accommodating groove 35, which extends along the whole of the connecting region and which can be engaged by the edge 34 of the form recess 21 of the covering hood 1 (FIG. 7).

The covering screen 10 has an accommodating opening 37, which is disposed symmetrically to a transverse center plane 36, and an external accommodating opening 38, into each of which a pipe screen 39 (FIG. 8) can be inserted. This arrangement of the accommodating openings 37, 38 makes a different use of the covering screen 19 possible, since the latter, rotated about its transverse center plane 36 by 180°, can be used in two operating positions. For this purpose, the covering screen is constructed symmetrically about its longitudinal center plane 36a.

The depth of contact of the lateral regions 40, 41 of the accommodating groove 35 can be such so as to make it possible to shift the covering screen 10 in the form recess 21 of the covering hood 1.

The pipe screen 39, which is shown in greater detail in FIGS. 8 and 9, is constructed with an external contour 43 conforming to the accommodating opening 37, 38 of the covering screen 10 and, in the connection region, is provided with an accommodating groove 42 in which the edge of the accommodating opening 37 or 38 can be inserted. In its simplest version, the pipe screen 39 can also be constructed as an insertable leaf which overlaps the accommodating openings 37, 38 at the edges.

For the leadthrough of branch piping, the pipe screen 39 has a center borehole 44, which is made to fit the diameter of the branch piping. An assembling slot 46 can be provided which runs from the borehole 44 to the lateral edge 45 on the back side and permits the pipe screen 39 to be placed on the pipe system.

Like that of the covering screen 19, the depth of the accommodating groove 42 of the pipe screen is so dimensioned in the edge regions 47, 48, that shifting, which is adaptable to the installing conditions, is possible.

What is claimed is:

1. An installation duct for elongated utility lines extending in a longitudinal direction and having branch lines extending generally perpendicularly from said elongated utility lines, said duct being mountable on a wall structure, the combination comprising a retaining strip mountable on said wall structure, a capping member mounted on said retaining strip to define a duct passage for said elongated utility lines between said retaining strip and said capping member, and a cover hood means mounted on said capping member and having feedthrough openings for said branch lines, said cover hood means comprising adaptable means which adapt said cover hood means to accommodate different branch piping arrangements.

2. An installation duct according to claim 1, wherein said retaining strip is mountable on a vertical wall structure with said elongated utility lines extending generally horizontally and said branch piping extending generally upwardly from said elongated utility lines.

3. An installation duct according to claim 1, wherein said branch lines each has a fitting part which extend toward said covering hood means.

4. An installation duct according to claim 1, wherein said cover hood means comprises a cover structure having a recess, a covering screen mounted in said recess, said covering screen having an accommodating opening, and a branch line screen mounted in said accommodating opening, said branch line screen having a branch line opening through which said branch line passes.

5. An installation duct according to claim 2, wherein said cover hood means has a vertical front cover wall, said front cover wall having an inside, said capping member having a vertical front capping wall which has an upper edge, the inside of said front cover wall having connecting means connected to said upper edge of said front capping wall.

6. An installation duct according to claim 5, wherein said cover hood means has lateral end walls which are disposed at an acute angle relative to said vertical front cover wall.

7. An installation duct according to claim 6 further comprising locking means on said lateral end walls lockingly connected to said capping member.

8. An installation duct according to claim 4, wherein said recess has an inner edge portion having a contour, said covering screen having an outer edge portion having a contour which conforms generally to the contour of said inner edge portion, one of said edge portions having an accommodating groove which accommodates the other edge portion.

9. An installation duct according to claim 8, wherein said one edge portion which has said accommodating groove is the outer edge portion of said covering screen, said accommodating groove receiving said inner edge portion of said recess while permitting shifting of the position of said covering screen relative to said cover structure.

10. An installation duct according to claim 4, wherein said covering screen has at least two of said accommodating openings with a branch line screen accommodated in each of said accommodating openings, each of said branch line screens having a branch line opening through each of which a branch line passes.

11. An installation duct according to claim 10, wherein said cover screen has a transverse center line, one of said accommodating openings being generally bisected by said transverse center line, another of said accommodating openings being spaced from said one accommodating opening.

12. An installation duct according to claim 11, wherein said cover screen in symmetrical about said transverse center line such that said cover screen can be inserted in said recess in two positions upon rotating said cover screen 180° about said transverse center line.

13. An installation duct according to claim 4, wherein said accommodating opening has an inner edge portion having a contour, said branch line screen having an outer edge portion with a contour which conforms generally to the contour of said inner edge portion of said accommodating opening.

14. An installation duct according to claim 13, wherein said outer edge portion of said branch line screen has a groove which receives the inner edge portion of said accommodating opening of said covering screen.

15. An installation duct according to claim 14, wherein said groove receives said inner edge portion of said accommodating opening of said covering screen while permitting shifting of the position of said branch line screen relative to said covering screen.

16. An installation duct according to claim 4, wherein said branch line screens are constructed as insertable leaves.

17. An installation duct according to claim 4, wherein said branch line opening in said branch line screen has a diameter substantially equal to the outer diameter of said branch line.

18. An installation duct according to claim 4, wherein said branch line screen has a lateral edge, and an assembly cut in said branch line screen extending from said lateral edge to said branch line opening.

* * * * *